United States Patent Office 3,289,248
Patented Dec. 6, 1966

3,289,248
BLOW MOLDING APPARATUS WITH BLOW-MOLD EXHAUST MEANS
John N. Scott, Jr., Fred Hicks, and Donald L. Peters, all of Bartlesville, Okla., assignors to Phillips Petroleum Company, a corporation of Delaware
Original application Mar. 23, 1962, Ser. No. 181,879. Divided and this application Oct. 23, 1965, Ser. No. 503,413
5 Claims. (Cl. 18—5)

This is a division of application Serial No. 181,879, filed March 23, 1962, and now Patent No. 3,246,062.

This invention relates to the molding of plastics. More specifically, it relates to an apparatus for blow molding a plastic material. In one aspect, this invention relates to a method and apparatus for circulating a coolant through a plastic containing mold. Another aspect of this invention relates to a method and apparatus for introducing to and exhausting a coolant from a plastic containing mold. In another aspect, this invention relates to a method of cooling a molded plastic object by providing a novel means for introducing coolant to and exhausting from a plastic containing mold. A still further aspect of this invention is to provide a molding apparatus which will allow an atomized coolant to be blown through the molded object without loss of heat in same. A still further aspect of this invention relates to the providing of a molding apparatus having means for circulating coolant through the molded item and so adapted that no heat loss is experienced in the mandrel of same.

The process of forming articles, particularly hollow blown articles, such as bottles, from plastic materials which are thermoplastic, hard at normal temperatures and rendered plastic and moldable under elevated temperatures and pressures, particularly organic plastic materials such as polyethylene, polypropylene, poly-1-olefins, copolymers, polystyrene, polyvinylchlorides, etc., comprises first the bringing of the material to a plastic and moldable condition. For this purpose, when using most thermoplastic materials, the material in a comminuted form is subjected simultaneously to heat and pressure. In the present instance, the means shown for accomplishing this purpose can be any plasticating means, such as an extruder or injection molding machine, having a parison extrusion die directly communicating therewith. In addition, materials capable of wet extrusion may be employed in the process of this invention, since they can be dried to evaporate the solvent and cooled by the method as herein disclosed.

A commercially useful process to which the instant invention is applicable comprises rendering the plastic material molten by an injection molding machine. Such plastication is obtained by forcing the plastic material by a ram through a heated cylinder having a torpedo centered therein. The molten material is fed from the injection nozzle to the parison extrusion die and the parison is extruded from said die by the force exerted by said ram. When an extruder is used as the plasticating means, the force supplied by the extruder screw is utilized to extrude the parison from the die. When using an extruder, one method of continuous operation of same is maintained by the use of at least two parison dies being fed alternately from the extruder. A less used method utilizes an extruder feeding molten plastic material to a reservoir chamber, wherein a piston intermittently forces material therefrom through a parison extrusion die. The invention is also applicable to another technique in which continuous extrusion is achieved by passing multiple molds beneath the extrusion head, picking up the parison and employing needle blowing of same.

The parison is extruded downward from the die, the mold closes around the parison, sealing together the lower end of the parison by clamping same together. The parison is expanded by positive pressure to the shape of the mold. After the article has taken shape and the mold is opened, the article is severed from the parent material at the die.

In carrying out the above process, the thermoplastic material is introduced for molding into a cooled mold and blown therein to the shape of the article. After the plastic is cooled and rigid the mold is opened and the article is removed. Copending application S.N. 102,243 filed April 11, 1961, describes a method for the internal cooling of blow molded objects by circulating a coolant through the item after sufficient pressure has been developed. The circulating coolant is exhausted through the same mandrel which served to introduce same into the mold. The exhaust conduit is in the extrusion mandrel. Temperature control of this heated extrusion mandrel is achieved by providing an air gap along the exhaust conduit in the extrusion mandrel. This air gapping was practical as long as the extrusion mandrel being used was of sufficient diameter to accommodate the requisite conduits along with the air gap. However, when a small diameter mandrel was required difficulty was encountered in providing the requisite flow of coolant under sufficient pressure to obtain a satisfactory object from the molding operation. Thus the technique is essentially limited to operations which utilize large blow molding parts.

We have now found that it is possible to employ the internal cooling principle by providing means to exhaust air and/or air-water mixture or other coolants without passing the exhausting fluids through the blowing mandrel. The production rate of blow mold items is increased by improving the efficiency of the cooling cycle by constructing the blowing mandrel with an air inlet conduit and an air outlet conduit which allows the coolant to exhaust through the side of the mold rather than through the blowing mandrel upon reaching a desired preset pressure which is sufficient to provide a complete expansion of the parison.

Therefore, an object of the present invention is to provide an apparatus to improve the efficiency of the cooling cycle of blown molded items.

Another object of this invention is to provide a reduction in the required cooling time so as to yield an increase in the production rate of the desired items.

Another object of this invention is to provide an apparatus for obtaining sufficient blowing pressure when utilizing mandrels having a small diameter.

Another object of this invention is to provide an apparatus for blow molding plastic objects without any appreciable cooling of the mandrel being employed.

A still further object of this invention is to provide a means for providing the requisite blowing and cooling fluids to a mold.

Other aspects, objects and the several advantages of the invention are apparent from a study of this disclosure, the drawings and the appended claims.

Thus, according to this invention, there is provided an apparatus for use in the manufacture of blown hollow articles from organic plastic materials which are expandible by blowing and thereafter capable of being rigidified. Such a method and apparatus provide for the increased production rate of such plastic materials by reducing the in-mold cooling time ordinarily required in the extrusion of such materials and avoiding heat loss in the mandrel.

FIGURE 3 shows the complete molded object.

Figure 1:
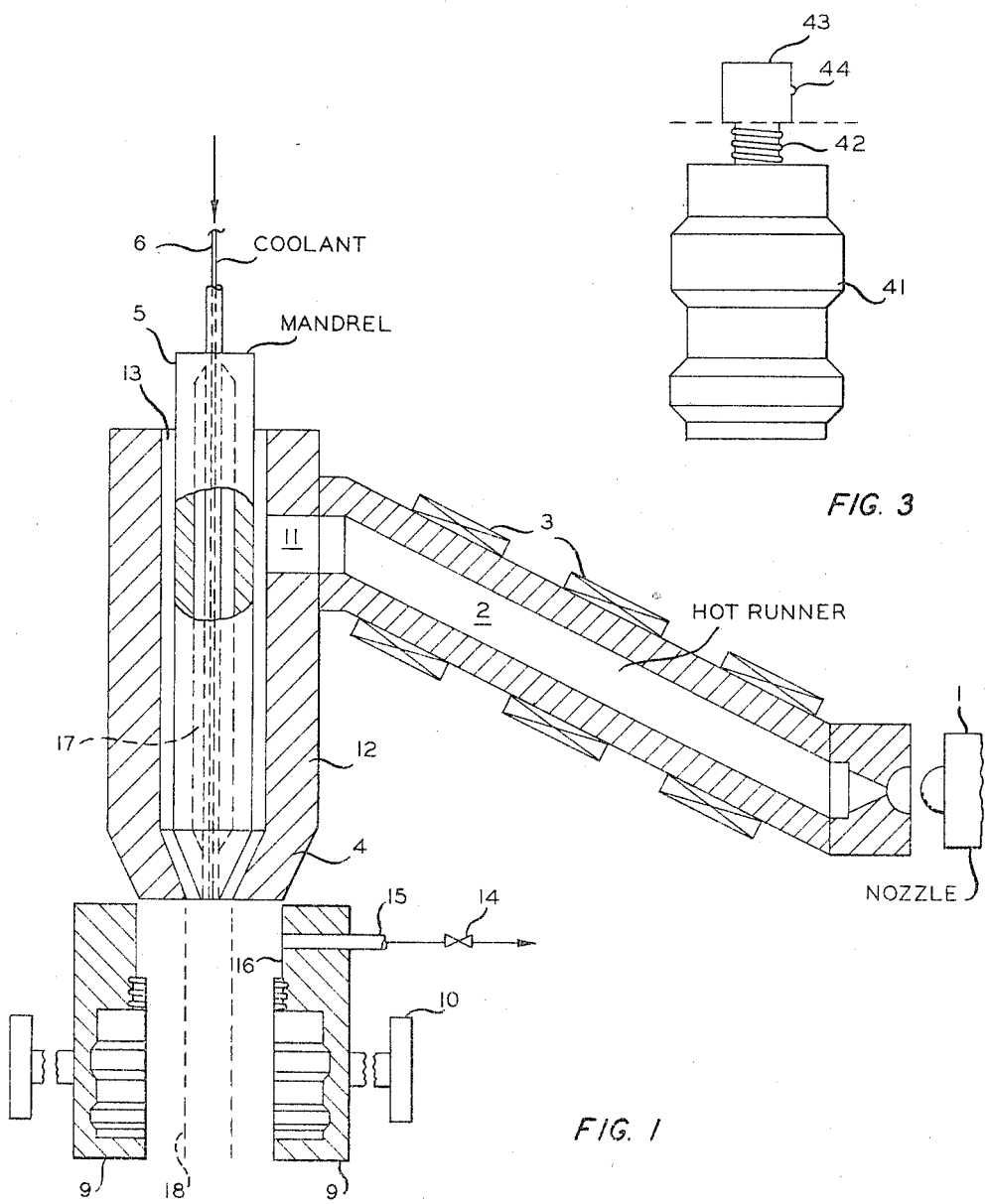
FIGURE 1 is a sectional view of the blow molding system of this invention.

Referring now to FIGURE 1, molten polymer is fed from a plasticating means such as an extruder or injection molding machine, not shown, to nozzle 1 which communicates with hot runner 2 encircled by heater bands 3. Molten polymer is fed from the hot runner 2 to parison die 4 through conduit 11. The parison die comprises cylindrical housing member 12, having mandrel 5 disposed therein to form annular area 13. Conduit 6 is concentrically positioned in mandrel 5 and insulated by means of air gap 17. Mold halves 9 operated by air cylinders 10 close around parison 18 extruded from annular area 13. Exhaust pressure relief valve 14 is provided in conduit 15 so as to allow the mold to be exhausted at a predetermined pressure. Conduit 15 is so provided as to protrude slightly into the area 16 of mold 9. Mold halves 9 are provided with an indented area 16 which serves to provide an area of the molded object through which the mold can be exhausted. This portion of the molded object is then removed upon completion of the molding cycle.

Figure 2:
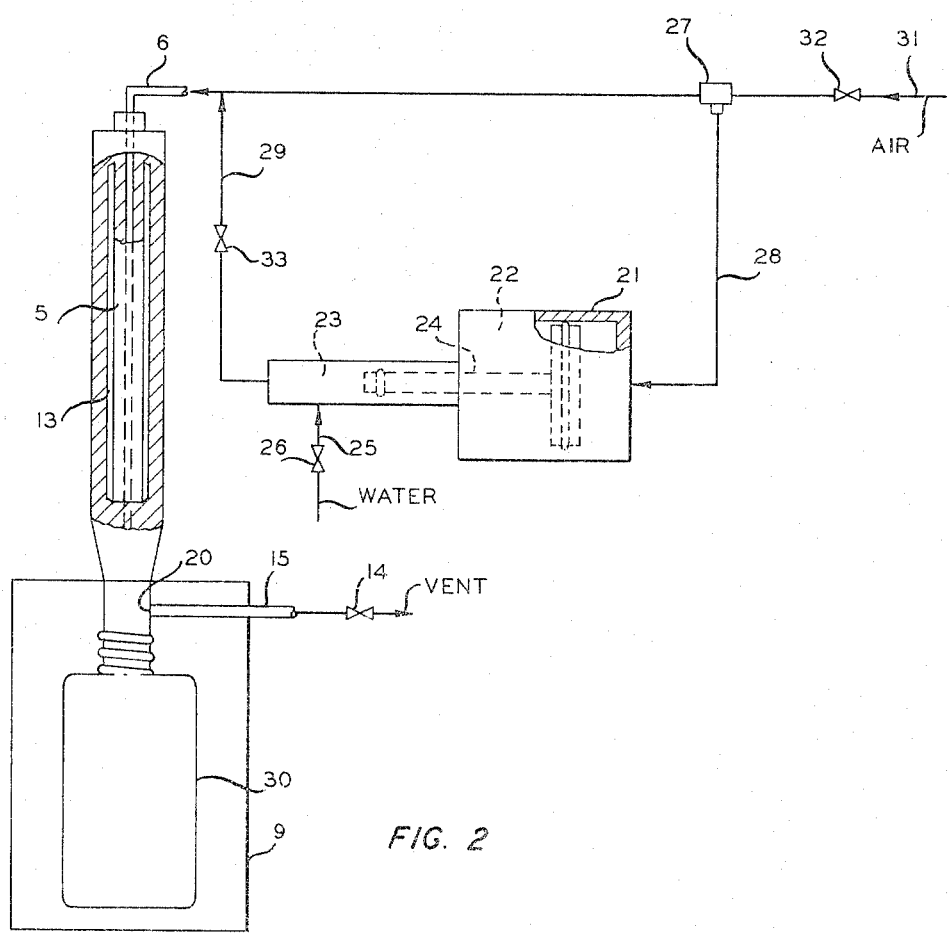
FIGURE 2 is a sectional view of the mandrel showing the air and coolant circulating means.

In FIGURE 2, mandrel 5 is shown in communication with mold 9. Air from a source not shown travels through conduit 31 communicating with conduit 6. Directional valve 32 in conduit 31 regulates the flow of air in relation to the forming cycle. Air travels through conduits 31 and 6 into bottle 30 and then through an exhaust hole 20 blown in the side of the molded bottle at conduit 15 and then through valve 14. Coolant injector mechanism 21 comprises chambers 22 and 23. Piston 24 is positioned in chambers 22 and 23. Coolant enters chamber 23 through check valve 26 and conduit 25. Air from conduit 31 enters chamber 22 through T 27 and conduit 28. Coolant is removed from chamber 23 via conduit 29 through relief valve 33 and travels through conduit 6, bottle 30 and exhaust hole 20.

In operation, when the air supply is shut off coolant fills chamber 23 and pushes piston 24 further into chamber 22. When the air is supplied and sufficient pressure is created on piston 24 to increase the pressure of the coolant in chamber 23 greater than that set on relief valve 33, relief valve 33 opens and allows the coolant to flow through the bottle as mist in the air. Check valve 26 prevents the coolant pressured in chamber 23 from backing into conduit 25. Relief valve 33 is preset to open approximately simultaneously with the opening of relief valve 14.

High blow pressure may be utilized to rapidly force air into the parison without ever actually developing this pressure in the mold. Thus, relief valve 14 is set to exhaust at a relatively low pressure. The rapid blow is important in the obtaining of a good smooth surface.

Chamber 23 may be provided with a liquid volume adjustment means. This means comprises a rod that is adjustably inserted in the coolant chamber 23 to control the volume of coolant in same.

As shown in FIGURE 3, the molded object 41 as taken from the mold has the desired neck portion 42 and an upper area of plastic 43 which will be subsequently removed. The upper area of plastic 43 is formed in the indented area 16 as shown in FIGURE 1. This is so provided that the air and coolant used in forming the object can be blown through the side of same and exhausted through conduit 15. The pressure of the coolant and blowing medium serve to rupture the side of the blown object to form outlet 44 through which the fluid is then exhausted. After removal from the mold, the upper zone 43 is severed from the remainder of the desired blow molded object.

The protrusion of conduit 15 into indented area 16 of the mold 9 is desirable to assure appropriate rupture of the molded item at this point so as to allow the desired exhausting of coolant from the molded item at the end of the cooling cycle.

The following examples are provided to further illustrate the present invention.

*Example I*

A 22-ounce capacity bottle weighing 42.5 grams was molded with a stock temperature of 430° F., a mold temperature of 80° F., and a blowing pressure of 60 p.s.i. To provide the necessary cooling, the pressure was held until the bottle had cooled to 240° F. in the neck section. This temperature was determined by the use of a neck temperature needle pyrometer. By the use of this standard technique with no air being circulated, a 10-second blowing time was required.

*Example II*

The same process as that of Example I is carried out but providing therein a relief valve on the mold preset at 60 p.s.i. so that 60 p.s.i. air is circulated through the mold and with the additional modification that 5.3 grams of water are atomized into the circulating air through the bottle approximately 0.5 second after blowing started and stopped approximately 2.5 seconds before termination of the blowing time and exhausted at the neck area. By the use of this technique, a 6-second blowing time was required to achieve a neck temperature of 240° F.

Reasonable variations and modifications can be made within the scope of the present invention, the essence of which is that there is provided an apparatus for blow molding which comprises means for extruding said plastic material, conduit means for introducing circulating fluid at superatmospheric pressure within the extruded plastic material to expand same by blowing, molding means cooperating with said extruding means which receive and form the extruded material, and exhausting means which is so adapted as to allow passage of the circulating fluid through a portion of the blown hollow article.

We claim:

1. Apparatus for blow molding a thermoplastic object comprising in combination sectional mold means which form, when closed, a cavity for forming a molded thermoplastic object, die means having a mandrel means disposed therein in communication at a first end thereof with a supply of molten thermoplastic material so as to extrude from the second end thereof an open-ended tube of thermoplastic material into the space between the open mold sections, said mandrel and die means comprising first, second and third concentric elongated cylinders, said first elongated cylinder forming a first annulus in communication with said cavity at a first end thereof and so extended at the second end thereof to form a first conduit operatively connected to a source of a gaseous pressure medium, said second elongated cylinder disposed around said first elongated cylinder and spaced apart therefrom so as to form a second annulus area, said first and second elongated cylinders being so adapted as to close each end of said second annulus thereby forming a closed annulus between said first and second cylinders, thereby insulating said first annulus, said third elongated cylinder disposed around said first and second elongated cylinders and spaced apart therefrom so as to form a third annulus, said third annulus being operatively connected to said supply of thermoplastic material at a first end thereof and adapted at the second end thereof to form said tube of thermoplastic material, said mold halves being provided with means, when closed to pinch off said tube at a point remote from said die and mandrel means and to close around said mandrel means at a point adjacent thereof and further adapted to carry in the area thereof adjacent said mandrel unobstructed conduit-like exhaust means for the removal of gaseous medium from the mold when closed.

2. The apparatus of claim 1 wherein said exhaust means is further provided with means to regulate the pressure within said mold means.

3. The apparatus of claim 1 wherein said first conduit has operatively connected thereto means to introduce an atomized liquid coolant into said gaseous pressure medium.

4. Apparatus for blow molding a thermoplastic object comprising in combination sectional mold means which form, when closed, a cavity for forming a molded thermoplastic object, die means having a mandrel means disposed therein in communication at a first and thereof with a supply of molten thermoplastic material so as to extrude from the second end thereof an open-ended tube of thermoplastic material into the space between the open mold sections, said mandrel and die means comprising first, second and third concentric elongated cylinders, said first elongated cylinder forming a first annulus in communication with said cavity at a first end thereof and so extended at the second end thereof to form a first conduit operatively connected to a source of a gaseous pressure medium, said second elongated cylinder disposed around said first elongated cylinder and spaced apart therefrom so as to form a second annulus area, said first and second elongated cylinders being so adapted as to close each end of said second annulus thereby forming a closed annulus between said first and second cylinders, thereby insulating said first annulus, said third elongated cylinder disposed around said first and second elongated cylinders and spaced apart therefrom so as to form a third annulus, said third annulus being operatively connected to said supply of thermoplastic material at a first end thereof and adapted at the second end thereof to form said tube of thermoplastic material, said mold halves being provided with means, when closed, to pinch off said tube at a point remote from said die and mandrel means and to close around said mandrel means at point adjacent thereof and further adapted to carry in the area thereof adjacent said mandrel unobstructed conduit-like exhaust means for the removal of gaseous medium from the mold when closed, apparatus for blow molding a thermoplastic object comprising in combination sectional mold means which form, when closed, a cavity for forming a molded thermoplastic object, die means having a mandrel means disposed therein in communication at a first end thereof with a supply of molten thermoplastic material so as to extrude from the second end thereof an open-ended tube of thermoplastic material into the space between the open mold sections, said mandrel and die means comprising four concentric elongated cylinders disposed within themselves so as to form a first, second, third and fourth annulus, said first annulus being operatively connected to said supply of thermoplastic material at a first end thereof and adapted at the second end thereof to form said tube of thermoplastic material, said fourth annulus being in communication with said cavity at a first end thereof and so extended at a second end thereof to form a first conduit operatively connected to a source of a gaseous pressure medium, said second annulus being closed at both ends thereof so as to form a closed annulus area between said first and third annulus, said third annulus being in communication with said cavity at a first end thereof so as to form a conduit for the removal of said gaseous medium, said mold halves being provided with means, when closed, to pinch off said tube at a point remote from said die and mandrel means and to close around said mandrel means at a point adjacent thereof, second conduit means adapted to said first conduit means so as to connect same to a liquid coolant injection means to introduce a liquid coolant into said gaseous pressure medium, third conduit means in association with said first conduit means and said liquid coolant injection means at a first end thereof adapted as to actuate the operation of same, said second conduit means being in association with a second end of said liquid coolant injection means and said first conduit means to introduce liquid coolant into said first conduit, fourth conduit means in association with said liquid coolant injection means so adapted as to introduce coolant for injection through said second conduit into same, first valve means in said first conduit means to regulate the flow of gaseous medium therein, second valve means in said second conduit means to regulate the flow of coolant into said gaseous medium, third valve means in said fourth conduit means to prevent backup of liquid coolant therein and fourth valve means in said third annulus to regulate the circulation and removal of coolant and gaseous medium through said blow molded hollow object.

5. Apparatus according to claim 4 wherein said exhaust means include a conduit extending through said mold and a pressure relief valve connected to said conduit to allow fluid to be exhausted from said mold in response to a predetermined pressure therein.

References Cited by the Examiner
UNITED STATES PATENTS

| | | | |
|---|---|---|---|
| 2,903,740 | 9/1959 | Parfrey | 18—5 |
| 3,114,931 | 12/1963 | Pelikan | 264—98 |

J. SPENCER OVERHOLSER, *Primary Examiner.*

W. L. McBAY, *Assistant Examiner.*